BLINKING CURSOR FOR CRT DISPLAY

Filed Aug. 24, 1967

INVENTOR
CHARLES A. KIESLING
BY Alfred E. Hall
ATTORNEY 3,531,796

BLINKING CURSOR FOR CRT DISPLAY

Charles A. Kiesling, Minneapolis, Minn., assignor to Sperry Rand Corporation, New York, N.Y., a corporation of Delaware

Filed Aug. 24, 1967, Ser. No. 663,049
Int. Cl. G08b *23/00;* H01j *29/52*
U.S. Cl. 340—324 4 Claims

ABSTRACT OF THE DISCLOSURE

Circuitry for facilitating the visual location of a point-of-entry cursor on a CRT screen when it is positioned over a character. The invention is accomplished by alternately painting the cursor symbol and the character over which it is positioned.

BACKGROUND OF THE INVENTION

Alphanumeric display systems are becoming increasingly important in man-machine communication systems. The systems include a cathode ray tube upon which either the operator, through a keyboard, or the computer may enter alphanumeric characters. If the operator is entering the alphanumeric characters by means of the keyboard, he must have some means for determining where the next character is to be entered on the CRT screen. Also, once the screen contains a complete message, whether entered by the operator or the computer, the operator must have editing capabilities whereby he may insert or delete characters. This will also require some means to enable the operator to determine where the beam is located in order that the editing may be accomplished.

To implement the editing requirement and to enable the operator to determine where the next character is to be entered, a point-of-entry cursor is provided in most display systems. The form of the cursor varies from system to system but is generally a horizontal line segment, a vertical line segment or a combination thereof or a bright spot. In commonly assigned copending application Ser. No. 436,174 filed Mar. 1, 1965 (now Pat. No. 3,466,645) a display system is disclosed in which the cursor is, generally, in the form of an inverted, reversed capital L, i.e. intersecting horizontal and vertical line segments which are positioned above and to the right of the character location.

The cursor in presently available systems has not satisfactorily performed the function for which it was intended. Whenever the cursor is positioned over a character that has already been painted on the screen, it becomes difficult to locate it. The more characters on the screen the more difficult it becomes to locate the cursor. Thus, since the whole purpose of the cursor is to enable the operator to locate the screen position at which the next character would be displayed if it were initiated, it is desirable to provide some means for accentuating the cursor position.

SUMMARY OF THE INVENTION

The present invention solves the problem by detecting the simultaneous occurrence of the cursor and a character at the same location and then accentuating that location by alternately tracing the cursor symbol and the character symbol. Thus, both the character symbol and the normal character over which it appears are displayed at normal intensity only one-half the time. The alternate appearance of the two symbols causes the position to assume a blinking appearance. It is obvious, of course, that the position could be accentuated by causing either the cursor or the character above to blink. However, it has been found that the blinking is most satisfactory when the two symbols appear alternately.

Because the screen is refreshed at a 60 Hz. rate, this would mean that the cursor would be painted 30 times and the character would be painted 30 times each second. Although blinking occurs, it is at a fast rate and both the cursor and the character are dimmed in appearance and the blinking is not as prominent as desired. Therefore, the cursor is painted a predetermined number of times and then the character is painted a predetermined number of times. This not only slows down the blinking to a rate which is acceptable to the eye but it also causes both the cursor and the character to have normal brightness. Thus, the blinking is prominent to the eye.

It is therefore an object of the present invention to improve cathode ray tube display system operator performance by accentuating the point of entry cursor position whenever it is positioned over a character.

It is also an object of the present invention to accentuate the point of entry cursor position by causing it and the character over which it is positioned to be alternately painted whereby the position is caused to blink.

It is still a further object of the present invention to enhance the brightness of the blinking cursor by painting the cursor a predetermined number of times and then painting the character over which it is positioned a predetermined number of times and then repeating the sequence whereby the cursor and the character have normal brightness.

BRIEF DESCRIPTION OF THE DRAWINGS

These and other more detailed and specific objects will be disclosed in the course of the folowing specification, reference being had to the accompanying drawings, in which.

DESCRIPTION OF THE PREFERRED EMBODIMENT

Figure 1:
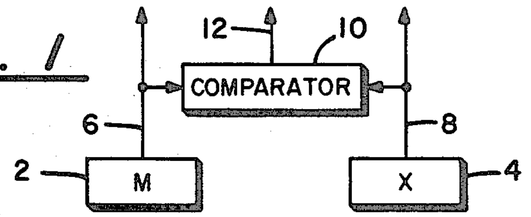
FIG. 1 shows a preferred circuit for determining where the cursor, and thus the character, should be painted.

In the above identified copending application there is disclosed the preferred circuitry for determining where and when the cursor should be painted. The general block diagram of the circuitry is shown in FIG. 1 of the present application. M-register 2 is a register that stores in digital form the position of the cathode ray tube beam at any time. This register is automatically and continually incremented by unity so that the beam continually moves across every character position and every line of the CRT screen 60 times every second. The screen is divided into a number of lines each having a particular number of characters. For example, there may be 16 lines with 32 characters in each line. Thus, the data stored in M-register 2 at any time represents one of the 512 positions available if the above example is used.

The X-register 4, or cursor address address register, stores in digital form the location of the CRT screen at which the cursor is to be painted. Thus, whenever it is desired to move the cursor from one position to another, it is necessary to either increment or decrement the contents of the X-register. This can be done in either of two ways. First, associated with the display is a memory which stores data that represents the characters to be displayed. Whenever the memory has data inserted in it from either the keyboard or the computer, the X-register is automatically incremented and the cursor moves to the next position. Secondly, when it is desired to cause the cursor to step without changing the data in the memory, the proper control key is depressed which produces a function bit signal that is coupled to the proper stages of the X-register depending upon the control key depressed. See the above identified copending application. In this case there is no change in the data stored in the memory because the function bit inhibits the transfer of data into the memory. However, because the X-register contents have been incremented or decremented, the cursor will move either up or down or right or left depending upon which control key has been depressed.

Thus, it will be seen that whenever the contents of the X-register and the M-register compare the cathode ray tube beam is positioned at the desired location on the screen where the cursor and the character, if any, are to be painted. The M-register 2 and the X-register 4 produce outputs on lines 6 and 8 respectively in FIG. 1 which are compared by comparator 10. Whenever the contents of the two registers are the same, comparator 10 produces an output on line 12 which can be used to control beam blanking and cursor painting.

Figure 2:
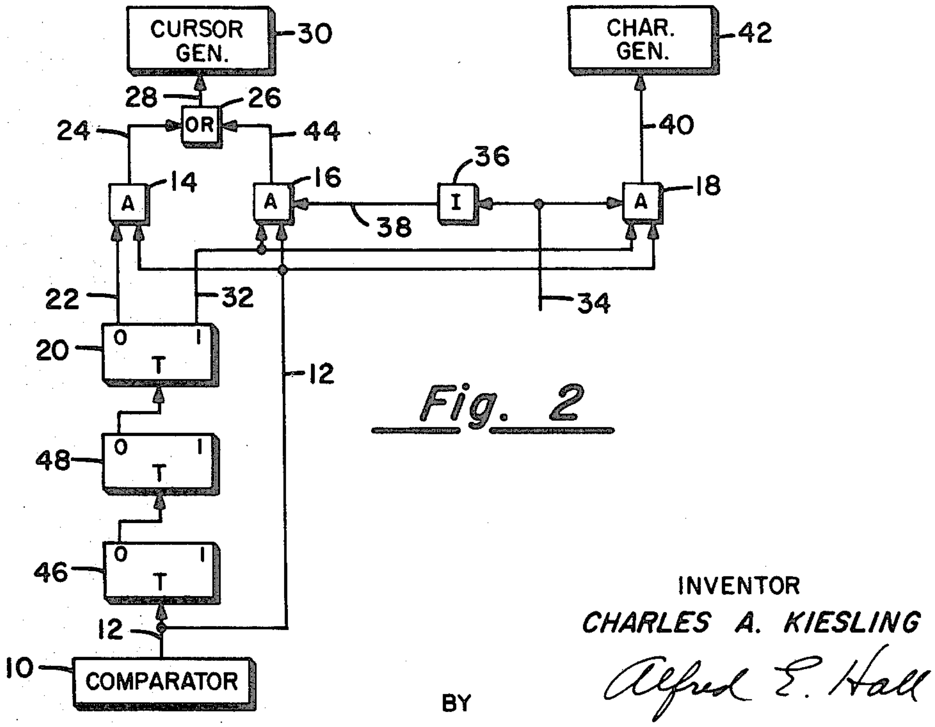
FIG. 2 illustrates the preferred embodiment of the present invention.

FIG. 2 discloses the circuitry of the present invention which utilizes the comparator 10 output to accentuate the cursor position. In order to properly understand the operation of the circuitry in FIG. 2, consider first the conditions under which the cursor and the character are to be painted. The cursor will normally always be painted whenever the data in the cursor location register 4 in FIG. 1 compares with the data stored in the beam position register 2. This means that as the beam goes stepping from one character position to another it will at some time reach the position indicated by the data in X-register 4 and at that position the cursor will be painted. There may or may not be data representing a character to be painted at that location. If there is, the circuitry must alternately paint the cursor and character symbol over which it is located to accentuate the cursor location. If there is no character to be painted at that location, the cursor will be painted continuously instead of alternately.

Assume now that comparator 10 is producing a compare signal on line 12 which is coupled to all three AND gates 14, 16 and 18. Assume also that toggle F/F20 is producing an output on line 22 that is also coupled to AND gate 14. AND gate 14 is then enabled and it produces an output on line 24 that is coupled to OR gate 26 which also produces an output on line 28. This output is coupled to the cursor generator 30 which is of the type disclosed in FIG. 8 of the above identified copending application. Thus, as long as toggle F/F20 is producing its output on line 22, the cursor will be painted each time comparator 10 produces an output on line 12. Comparator 10 will produce an output on line 12 each time the electron beam of the CRT completely scans the face of the CRT once.

Assume now that toggle F/F20 is producing an output on line 32 which is coupled to both AND gates 16 and 18. Assume also that a signal representing that a character is to be painted is present on line 34 as an enable signal to AND gate 18 through inverter 36 on line 38 as an inhibit signal to AND gate 16. The output of AND gate 18 on line 40 will enable character generator 42 which is preferably of the type disclosed in the aforesaid copending application. This means that a character will be painted each time the comparator 10 produces an output on line 12 provided that the toggle F/F20 is producing an output on line 32 and that data representing a character is present on line 34. As long as these conditions exist, the character will be painted each time the CRT beam scans the face of the tube.

For the third condition, assume that the toggle F/F20 is producing an output on line 32, that comparator 10 is producing an output on line 12 and that no character is to be painted and, thus, no signal is present on line 34. Under these conditions, AND gate 14 is inhibited with no signal present on line 22, AND gate 18 is inhibited with no signal present on line 34 and AND gate 16 is enabled with a signal on line 32 from toggle F/F20, a signal on line 12 from comparator 10 and a signal from inverter 36 on line 38. Thus, AND gate 16 produces an output on line 44 which is coupled to OR gate 26 via line 44. As stated above, OR gate 26 produces an output on line 28 which drives cursor generator 30.

Thus, it will be seen that each time the beam scans the face of the CRT, i.e. 60 times per second, either the cursor is painted continuously or the cursor and the character are painted alternately. As stated previously, if the cursor and character are painted alternately at the 60 cycle rate, they are both dimmed in brightness and the flicker rate is so fast that it is not readily discernible with the eye. It has been found that if the flicker rate is reduced to a value in the range of 6–15 Hz. that not only is the blinking prominent to the eye but also each of the charatcers has the normal brightness associated with it. Therefore, toggle F/F's 46 and 48 have been added in series with toggle F/F20 and comparator 10. Since the toggle F/F's are bistable devices, it will readily be seen that it will require 4 inputs from the comparator before F/F20 can be toggled. Thus, if F/F20 is producing an output on line 22 to AND gate 14 and a cursor is being painted, it will be seen that the cursor will be painted for the next 4 cycles of the electron beam, i.e. for the next 4 comparator outputs. In like manner, if AND gate 18 is enabled, the character will be painted for the next 4 comparator outputs. Thus, the 60 Hz. scan rate has been reduced in effect to 15 Hz. Since, if data is present, the character is being painted half the time and the cursor the other half of the time, the flicker rate has been reduced to 7½ Hz.

Figure 3:
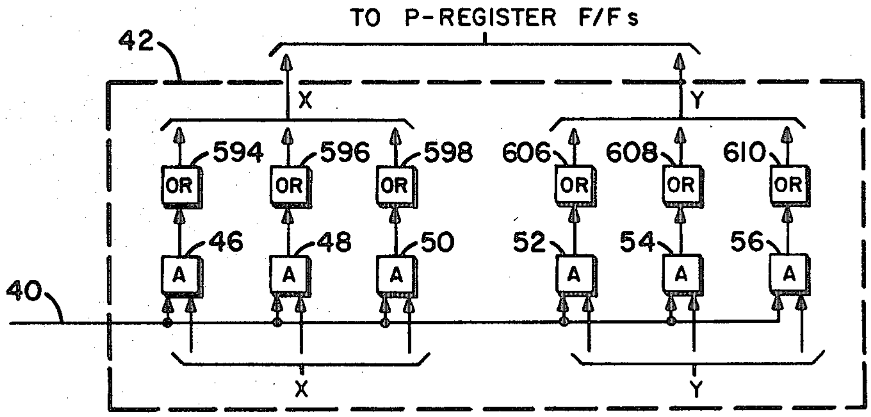
FIG. 3 illustrates how the present invention would be connected to the circuitry of the prior art.

The circuitry in FIG. 3 shows how the character generator in the above identified copending application could be modified to receive the output signal from AND gate 18 on line 40 in FIG. 2. OR gates 594, 596, 598, 606, 608 and 610 are shown in FIG. 8 of the copending application. AND gates 594, 596 and 598 receive the signals for moving the beam along the X-axis while AND gates 606, 608 and 610 receive the signals for moving the beam along the Y-axis. All that is required to utilize this circuit with the blinking cursor circuitry is the addition of AND gates 46, 48 and 50 in the X-axis input lines and AND gates 52, 54 and 56 in the Y-axis input lines. Whenever AND gate 18 in FIG. 2 produces an output on line 40 which indicates that a character is to be drawn, it enables AND gates 46, 48, 50, 52, 54 and 56 and the character is painted with the signals on the input lines to these AND gates.

The present invention therefore provides an important improvement in the CRT display art in that it allows an operator to readily locate the point-of-entry cursor whenever it is located over a character.

What is claimed is:

1. In an alphanumeric display system including a cathode ray tube having an electron beam positionable in any one of a plurality of locations on a viewing screen:

(a) first means coupled to said cathode ray tube for causing said beam to paint first symbols such as alphanumeric characters at any one of said plurality of locations on said viewing screen, (b) second means coupled to said cathode ray tube for causing said beam to paint a second symbol such as a point-of-entry cursor at any one of said plurality of locations on the viewing screen of said tube, and (c) third means coupled to said first and second means for producing cursor and character control signals which cause said first and second symbols to be painted intermittently whenever said cursor is positioned in the same location as one of said alphanumeric characters whereby said cursor can be easily located.

2. A display system as in claim 1 wherein said third means comprises:

(a) a comparator for producing an output signal when said cursor location and said beam position compare, (b) means for producing a data signal when one of said alphanumeric characters is to be painted, (c) a bistable circuit coupled to said comparator for utilizing said output signal to produce first and second intermittent output signals, (d) a first AND gate coupled to said bistable circuit for receiving said first intermittent signal and coupled to said comparator for receiving said output signal whereby said cursor control signal is produced, and (e) a second AND gate coupled to said bistable circuit for receiving said second intermittent signal and coupled to said data signal producing means and said comparator means for producing a character control signal.

3. A display system as in claim 2 and further including:

(a) an inverter coupled to the output of said data signal producing means for producing an output when there is no data signal present, and (b) a third AND gate coupled to said bistable circuit, said comparator and said inverter for producing a cursor control signal when no data signal is present but said second intermittent output signal and said comparator output signal are present.

4. A display system as in claim 3 and further including:

(a) a plurality of bistable devices serially connected between said comparator and said bistable circuit whereby a plurality of output signals from said comparator are required to change the state of said bistable circuit.

References Cited

UNITED STATES PATENTS

| | | | |
|---|---|---|---|
| 2,832,073 | 4/1958 | Arkins et al. | |
| 3,364,473 | 1/1968 | Reitz et al. | |
| 2,405,231 | 8/1946 | Newhouse. | |
| 2,695,953 | 11/1954 | Seabury | 315—30 |
| 3,118,141 | 1/1964 | Bailey. | |
| 3,346,853 | 10/1967 | Koster et al. | 340—324 X |

ALVIN H. WARING, Primary Examiner

D. L. TRAFTON, Assistant Examiner

U.S. Cl. X.R.

315—30